Nov. 18, 1969  E. THURNER  3,478,638
ANCHORAGE NAIL
Filed Feb. 12, 1968
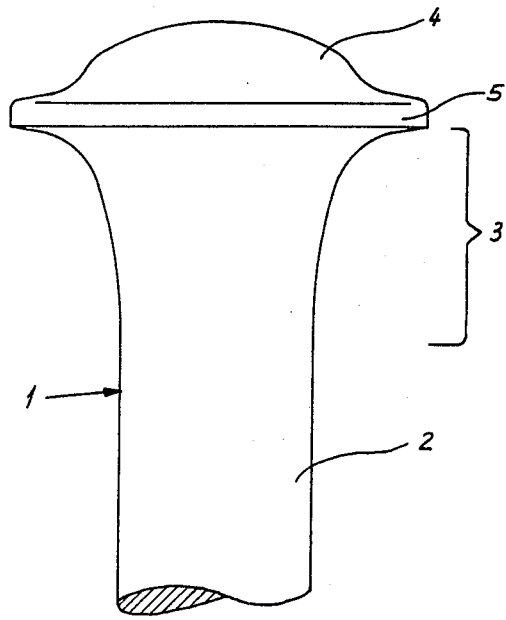
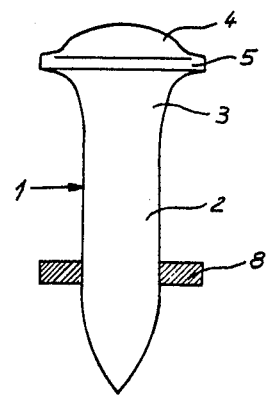
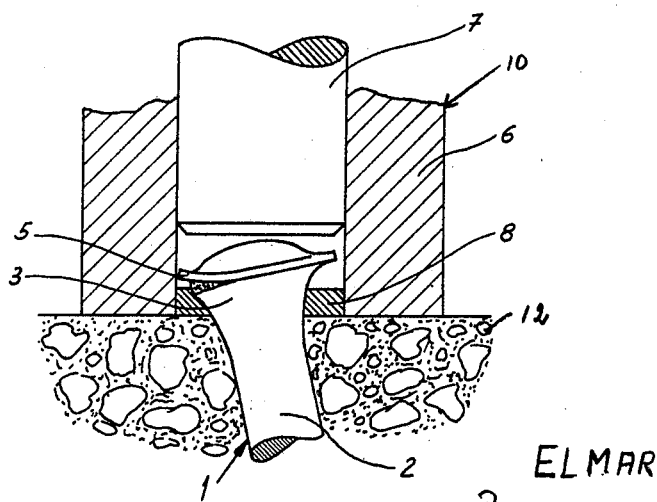
INVENTOR
ELMAR THURNER

# United States Patent Office 3,478,638
Patented Nov. 18, 1969

3,478,638
ANCHORAGE NAIL
Elmar Thurner, Feldkirch-Gisingen, Austria, assignor to Hilti A.G., Schaan, Liechtenstein
Filed Feb. 12, 1968, Ser. No. 704,753
Claims priority, application Germany, Mar. 7, 1967,
H 62,048
Int. Cl. F16b 15/02
U.S. Cl. 85—28                                    4 Claims

ABSTRACT OF THE DISCLOSURE

A nail of a type which is adapted to be driven in a hard receiving material such as concrete includes a large head diameter compared to its shaft diameter. The nail shaft is widened in a convex manner toward the head over a length adjacent the head corresponding substantially to the shaft diameter. The widening curve is preferably made such that the first and second thirds of the curve in a direction proceeding toward the head are relatively flat but become rapidly steep in the last third-portion which terminates in the outside diameter of the rim of the head. A flat rim is advantageously stamped around the head and the rim diameter is substantially double or triple the shaft diameter.

SUMMARY OF THE INVENTION

This invention relates in general to the construction of anchoring devices and in particular to a new and useful nail which is adapted to be driven into a hard receiving material such as a concrete by a driving piston which may be hand- or power-operated and which includes a large head diameter compared to its shaft diameter.

In bolt setting devices where the driving energy for driving a nail into a hard receiving material is transmitted with a hammer piston to the nail a guide disk is usually attached to the shaft of the nail in order to form a guide for the front portion thereof. Instead of using a second guide disk, the nail head is frequently designed so that it provides a rear orientation or guidance of the nail in the barrel of the driving device. If such a nail having a head diameter which is rather large compared to its shaft diameter penetrates obliquely into the receiving material, the nail head is pressed flat to the receiving material by the energy of the hammer piston. A lever effect is produced in this process and there is a tendency for the nail head to become deformed or torn off when the known types of nails are employed. In the event that the head is torn off, it may injure the operator of the device or the people standing around. Besides, the destroyed nail is no longer useful as a supporting fastening element.

The above disadvantages are avoided by providing a nail head with a relatively large head portion and which includes a shaft portion which is widened in a convex manner adjacent the head. The convex widening curve is formed over a length of the shaft which corresponds substantially to the shaft diameter but which may be in a range of from not less than half the diameter to not more than 1½ times the diameter. The widening curve formed on the shaft portion adjacent the head is relatively flat in the first and second third-portions thereof but becomes much deeper in the last third-portion and terminates in the outside diameter of the head edge or rim. With such a construction the bending strength is increased considerably in the area of the shaft directly adjacent the head so that a tendency toward detachment of the nail head during driving-in is avoided. This is true even though the nail may be driven-in obliquely.

In the preferred embodiment of the construction, the nail includes a head which has a flat rim extending around the head and which absorbs the residual energy of the hammer piston when the head strikes the target or receiving material. If the head penetrates obliquely into the receiving material, the head rim is stressed by a lever action so that the rim may be deformed or partly sheared off. This permits the nail to perform its function despite the deformed head rim.

Accordingly, it is an object of the invention to provide an improved nail construction for use with a hand or explosive-powder operated bolt setting device which includes a widened head portion and a shaft with a portion adjacent the head which widens in a convex manner over a curve which is relatively flat at the shaft portion and increases rapidly toward the head and terminates at the rim of the head.

A further object of the invention is to provide a nail with a widened head and a widened shaft portion adjacent the head and which includes a flat rim which is stamped around the head and wherein the rim diameter is preferably double or triple the shaft diameter.

A further object of the invention is to provide a nail construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is an enlarged partial elevational view of a nail constructed in accordance with the invention;

FIG. 2 is an elevational view of the nail of FIG. 1 on a reduced scale and showing a guide disk therewith; and FIG. 3 is a partial section and partial elevational view of a bolt setting device with a nail constructed in accordance with the invention.

GENERAL DESCRIPTION OF THE PREFERRED EMBODIMENT

Referring to the drawings in particular, the invention embodied in FIG. 1 comprises a nail generally designated 1 having a cylindrical shaft 2 with a concavely curved widened portion 3 and a relatively wide head 4 with a flat rim 5 extending around it.

In accordance with the invention, the concave widened portion 3 is of a length corresponding substantially to the shaft diameter but which may be in a range which varies from half the shaft diameter to 1½ times the shaft diameter. The widening curve of the widened portion 3 is relatively flat in the first and second third-portions and becomes rapidly steep in the last third-portion adjacent the head. The steep portion of the curve terminates in the outside diameter of the head rim.

The nail 1 is used with a bolt setting device generally designated 10 for driving the nail into a hard receiving material such as a concrete 12. The nail 1 is positioned within a barrel 6 of the setting device 10 after a washer or guide disk 8 is engaged around its lower end. The rim 5 which is substantially equal to the interior diameter of the barrel 6 provides an upper guide for the nail. As indicated in FIG. 3, the hammer piston 7 of the driving device moves downwardly to drive the nail into the concrete 12. In the illustrated embodiment, the nail has penetrated obliquely into the receiving material 12. The head rim 5 bears unilaterally on the receiving material and the guide disk 8 and each is deformed. However, even in this extreme condition there is no breaking off of the head and the nail 1 still functions as an adequate securing device.

While a specific embodiment of the invention has been shown and described in detail to illustrate the application of the inventive principles, it will be understood that the invention may be embodied otherwise without departing from such principles.

What is claimed is:

1. A nail for use with an explosive powder operated bolt setting device and which is adapted to be driven into a hard receiving material, comprising a shaft portion terminating at one end in a penetrating point, a head portion larger in diameter than said shaft portion adjacent the other end of said nail, said head portion having an outer raised central portion defining a continuous dome and a flat annular rim portion between said central portion and said shaft portion, said rim portion extending radially outwardly of said central portion, the surface on said head portion which lies on the axis of the nail defining a maximum height of said head portion from said rim portion, said shaft portion including a substantially cylindrical portion and a concave widened portion between said substantially cylindrical portion and said rim portion of an axial length corresponding substantially to the diameter of said substantially cylindrical portions, said widened portion having an exterior concave surface defining a widened smooth curve which is of relatively slight taper in the first and second third-portions of the concave widened portion but which becomes rapidly steep in the last third-portion of the concave widened portion and terminates in the outside diameter of said rim portion, said rim portion being of an axial dimension with respect to that of said central portion whereby said rim portion will not be acted upon by a driving tool if the nail is driven obliquely, said axial dimension being relatively thin so that if said nail penetrates said receiving material obliquely, said rim portion will be stressed by a lever action and may be deformed to prevent the entire head portion from being deformed.

2. A nail according to claim 1, wherein said head portion includes a head having a diameter substantially in the range of from 2 to 3 times the shaft diameter.

3. A nail according to claim 1, wherein the lengtth of the concave widened portion of said shaft is in the range of from ½ the shaft diameter to 1½ times the shaft diameter.

4. A nail according to claim 1, wherein said central portion of said head is of a convex configuration and including a marginal outer portion above said rim portion which is substantially flat.

References Cited

UNITED STATES PATENTS

| 1,298,015 | 3/1919 | Curtis | 85—28 |
| 1,944,150 | 1/1934 | Brugge | 85—28 |

FOREIGN PATENTS

| 565,770 | 4/1958 | Belgium. |
| 60,575 | 4/1954 | France. |

RAMON S. BRITTS, Primary Examiner